(12) United States Patent
Westersten

(10) Patent No.: US 8,988,070 B2
(45) Date of Patent: Mar. 24, 2015

(54) METAL DETECTOR FOR USE WITH CONDUCTIVE MEDIA

(76) Inventor: Allan Westersten, Georgetown, CA (US)

( * ) Notice: Subject to any disclaimer, the term of this patent is extended or adjusted under 35 U.S.C. 154(b) by 353 days.

(21) Appl. No.: 13/374,947

(22) Filed: Jan. 23, 2012

(65) Prior Publication Data

US 2013/0187654 A1 Jul. 25, 2013

(51) Int. Cl.
*G01N 27/72* (2006.01)
*G01V 3/10* (2006.01)
*G01V 3/02* (2006.01)

(52) U.S. Cl.
USPC ............................ 324/239; 324/228; 324/329

(58) Field of Classification Search
USPC ........................................................ 324/239
See application file for complete search history.

(56) References Cited

U.S. PATENT DOCUMENTS 7,649,356 B2 * 1/2010 Earle ............................. 324/326
2002/0027438 A1 * 3/2002 Ott et al. ....................... 324/327

* cited by examiner

*Primary Examiner* — Bot Ledynh

(57) ABSTRACT

A pulse-induction type metal detector using a transmitter coil energizing pulse that selectively reduces the amplitude of background signals from conductive soils, ores and salt water. The detector can be operated with higher amplification of the received signals than conventional detectors, without driving the input amplifier into saturation. This makes it possible to detect land mines, tramp metal and gold in media whose characteristics make detection with conventional metal detectors difficult.

3 Claims, 4 Drawing Sheets

METAL DETECTOR FOR USE WITH CONDUCTIVE MEDIA

TECHNICAL FIELD OF THE INVENTION

This invention relates to metal detectors and specifically to detectors that are optimized for use with conductive media. The technology disclosed is applicable to pulse-induction type metal detectors.

BACKGROUND OF THE INVENTION

When metal detectors are used to detect targets in conductive media, the background signal amplitude may be so high that the input amplifier of the detector is driven into saturation.

When the gain of the input amplifier is lowered to make the detector operative, the sensitivity to targets is lowered correspondingly.

In prior art metal detectors, the background signals are dealt with by sampling the received signals at various times and by combining said samples algebraically, using multiplication factors that cause the background signals to essentially cancel.

US Application No. 20100148960 by Candy is an example of such technology. The above approach does not address the basic problem of the input amplifier being overloaded by high-amplitude background signals.

OBJECTS AND ADVANTAGES

The present invention provides a solution to the problem of input amplifier overload by minimizing the background signal amplitude at its very source, making it possible to maintain high amplification in the input amplifier, which results in higher sensitivity to targets.

THEORY OF THE INVENTION

The operating principle of the detector is based on the observation that when a very fast magnetic field step function is imposed on a target, one with a short time constant responds more than one with a long time constant.

Background signals usually have shorter time constants than the targets to be detected.

The background signals pose a problem mainly because the ground or a load on a conveyor belt has a very large volume compared to a target to be detected and despite the short time constant of the background signal, it will not have decayed enough to be insignificant at a time when a target signal is sampled.

Selectively minimizing the amplitude of the background signal without materially affecting the target signal is made possible by the use of a transmitter coil energizing wave form that combines a long charging interval for a target and a very short charging interval of the opposite polarity that essentially cancels eddy currents with a short time constant in the medium in which a target is located.

SUMMARY OF THE INVENTION

The salient distinction between the present invention and prior-art metal detectors is the inclusion of a short magnetic field step function at the end of a conventional charging interval of targets and the means required to regulate the magnitude of said step function, so that the background signal is essentially canceled. As the target signal amplitude is also lowered to some degree by said short magnetic step function, additional means are included in the invention to restore the sensitivity to targets with long time constants.

DETAILED DESCRIPTION OF THE INVENTION

Figure 1:
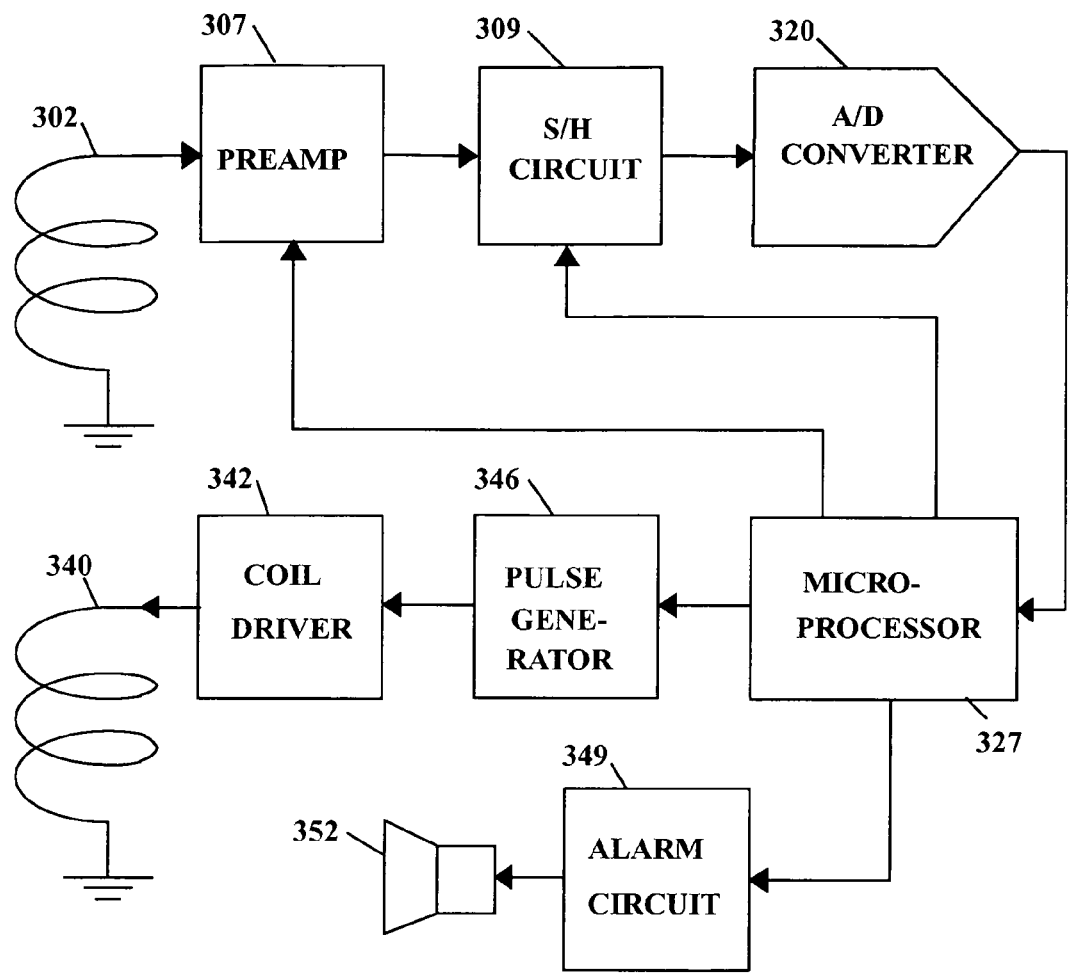
FIG. 1 shows the Block Diagram of the invention. The functions of the various blocks are well known to those skilled in the art and detailed descriptions of the blocks are therefore omitted to eliminate obfuscation and prolixity.

Microprocessor 327, shown in FIG. 1, delivers a digitally stored waveform to pulse generator 346, which in turn activates coil driver 342 that converts the voltage waveform to a current with a corresponding shape, imposing it on transmitter coil 340.

The magnetic field emanating from transmitter coil 340 engenders eddy currents in a target and its surrounding medium. The magnetic field generated by said eddy currents induces voltages in receiver coil 302. After the termination of the coil pulse, the eddy currents in the target and the surrounding medium decay toward zero, each according to its own time constant. At any point in time, the voltages captured by receiver coil 302 are summed algebraically, and in the state-of-the-art metal detector they are inextricably intermingled.

Figure 2:
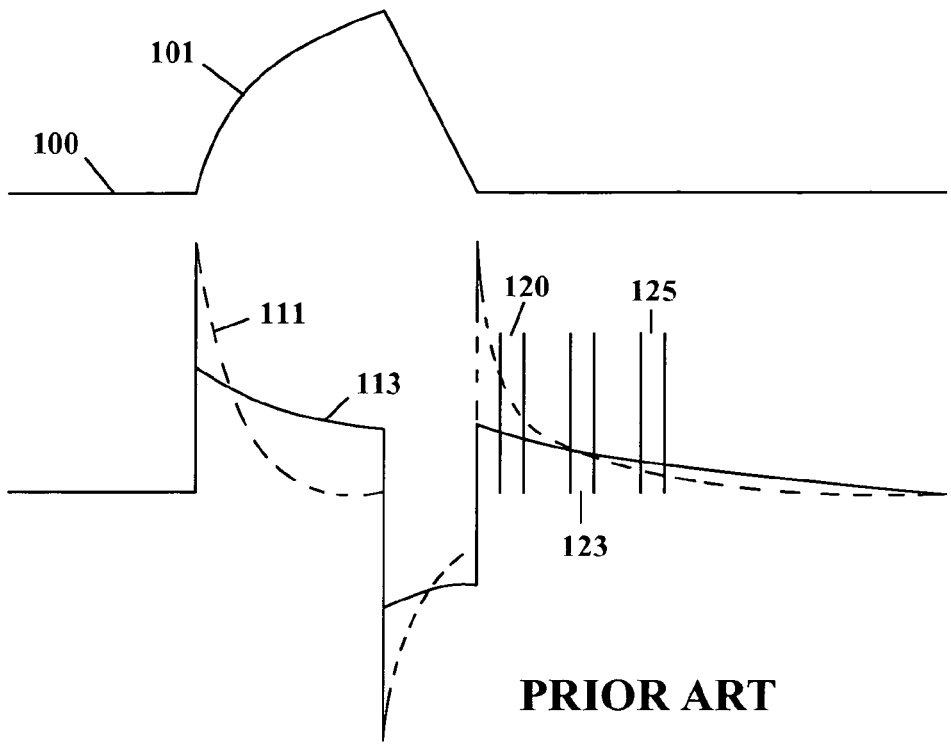
FIG. 2 shows the transmitter coil pulse and the signals received by the receiver coil in a conventional pulse-induction metal detector. Trace 100 is the base line and trace 101 shows the shape of the transmitter coil current. Trace 111 shows the signal generated by the background and trace 113 shows the signal generated by the target. Intervals 120, 123 and 125 show the intervals of time where the signals from the receiver coil are sampled.

In FIG. 2, trace 111 shows a voltage generated by the background medium and trace 113 shows the voltage generated by a target. The voltage with the shorter time constant is the background signal. As an example, a load of conductive ore on a conveyor belt may have a time constant of 10 uS and the smallest target of interest may have a time constant of 30 uS.

Figure 3:
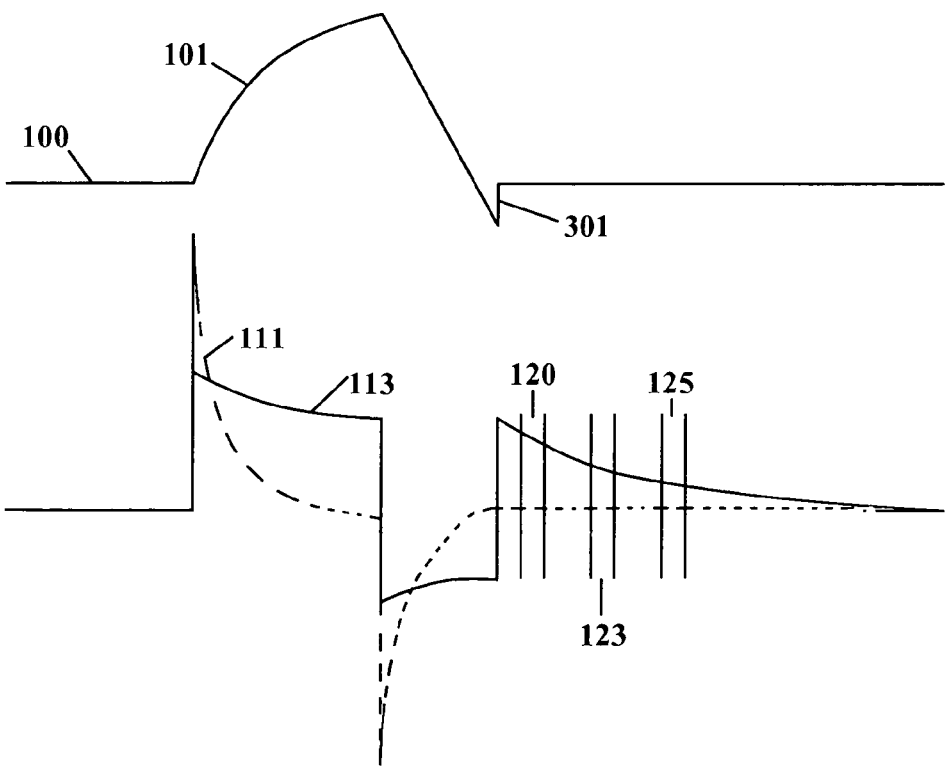
FIG. 3 shows the corresponding parameters in the present invention. Trace 301 shows the background signal canceling pulse. This is the salient departure from the conventional transmitter coil pulse wave form in pulse-induction metal detectors.

FIG. 3 shows the novel transmitter coil excitation wave form where the novel feature is indicated by trace 301. This is a fast magnetic step function, termed the background signal canceling pulse. At that point, the coil current is returned to zero with the maximal speed that the electronic circuitry allows. The effect of this quick excursion of the magnetic field is to essentially cancel the voltage with the short time constant while having only a minor effect on the voltage with the long time constant.

In FIG. 2, traces 120, 123 and 125 show the sampling intervals for the sample-and-hold circuit 309 of FIG. 1. Interval 120 represents sampling interval one, interval 123 represents sampling interval two, and interval 125 represents sampling interval three. The analog samples are digitized by A/D converter 320 and sent to microprocessor 327 which derives a first time constant Tc1, from samples one and two, and a second time constant, Tc2, from samples two and three. The processor then subtracts Tc1 from Tc2 and adjusts the amplitude of background signal canceling pulse 301 according to the result of said subtraction.

An examination of the voltage waveforms shown in FIG. 2, shows that a time constant calculation using samples one and two yields a shorter time constant than a calculation using samples two and three, because the influence of the voltage with the shorter time constant is greater during the earlier sampling intervals than during the later sampling intervals.

Figure 5:
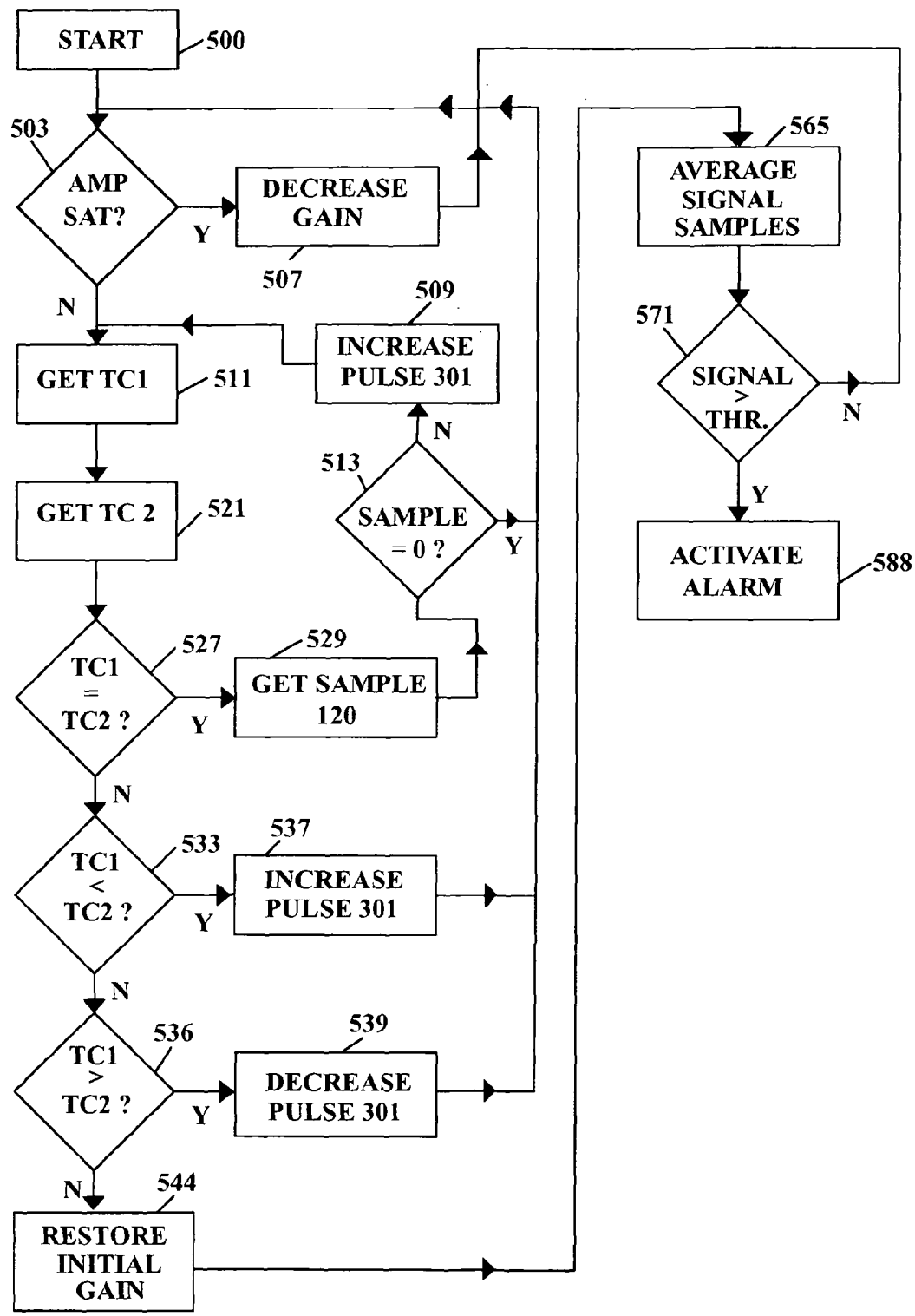
FIG. 5 shows the programming steps executed by microprocessor 327 in FIG. 1. The functions can be carried out in any programming language.

The programmatic steps required to accomplish the proper regulation of the amplitude of pulse 301 are shown in FIG. 5. The steps can be implemented by many different processors, by code that varies from processor to processor. The code required to implement the various steps is known to those skilled in the art and it does not merit further elaboration.

In FIG. 3, voltage 111 with the shorter time constant has been essentially eliminated by background signal canceling pulse 301. Hence, time constant calculations using samples one and two, and samples two and three yield essentially the same result. This is interpreted by the microprocessor as an indication that the amplitude of the background signal canceling pulse has been adjusted to the appropriate level.

The main object of the invention is to reduce the amplitude of the background signal so that the detector remains operative even when the background medium is highly conductive. The effectiveness of the background signal canceling procedure is evidenced by empirical data obtained by using a prototype of the invention: Referring to FIG. 2:
The peak amplitude of coil pulse 101=3 A
Background signal 111 time constant=10 uS
Target signal 113 time constant=30 uS
Background signal to target signal amplitude ratio=3
Referring to FIG. 3:
The peak amplitude of the coil pulse=3 A
The peak amplitude of the background signal canceling pulse=−1 A
The ground signal amplitude=+/−0 V
Target signal amplitude is reduced by 3.2%

The measurements were taken with sampling interval one 10 uS from the trailing edge of the coil pulse, and sampling intervals one, two and three were separated by 20 uS. The time constants used by processor 327 to regulate the amplitude of pulse 301 were derived from the formula:

$$\text{First time constant} = (T2-T1)/ln(V1/V2) \text{ and second time constant} = (T3-T2)/ln(V2/V3)$$

Where T1, T2 and T3 refer to the points in time when samples one, two and three were taken. V1, V2 and V3 refer to the voltages sampled during said time intervals. Ln refers to the natural logarithm.

Although the 3.2% reduction in sensitivity referred to above may not be significant, means to restore the sensitivity to what it would be without the conductive background medium is incorporated in the patent.

A lookup-table containing correction factors based on the correlation between the amplitude of the background signal canceling pulse and the time constant of the target is accessed by the processor and a corresponding correction signal is sent to input amplifier 307 to modify its gain as required.

The amplitude of the signal sampled during sampling interval one is compared with a preset threshold amplitude and when the threshold is exceeded, alarm circuit 349 is activated by the processor.

In FIG. 1, alarm circuit 349 activates sound generator 352, but additional types of alarm could be used without deviating from the concept of the invention.

Figure 4:
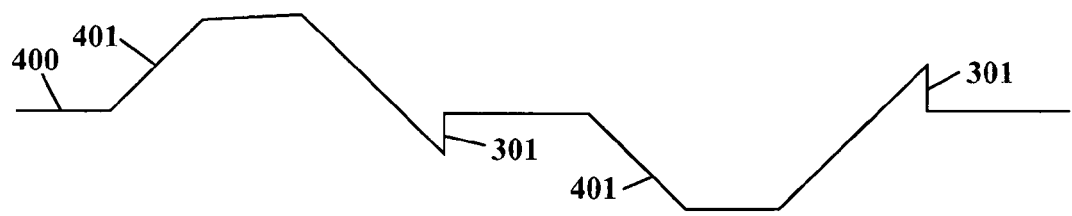
FIG. 4 shows the transmitter coil current waveform of FIG. 3 in a bi-polar version, where the current wave form 401 is symmetrical with respect to the base line 400.

FIG. 3 shows a coil energizing pulse of only one polarity, but bipolar pulses are commonly used in industrial metal detectors. The advantage derived from this is that any DC offset present at the output of preamplifier 307 is cancelled during demodulation of the signals by processor 327. Interference signals caused by extraneous magnetic fields are canceled in a similar fashion The Preferred Embodiment of the Invention The preferred embodiment of the invention is shown by FIGS. 1 through 5 and described in the detailed description of the invention. The preferred transmitter coil current wave form is shown in FIG. 4.

I claim:

1. A pulse-induction type metal detector comprising:
   (a) a transmitter coil;
   (b) means to energize said transmitter coil with a current wave form whose trailing edge reverses polarity after crossing zero and returns rapidly to zero, after the portion of said waveform with reversed polarity has reached a predetermined amplitude;
   (c) a receiver coil;
   (d) means to amplify and process signals captured by said receiver coil, using at least three signal sampling intervals to derive a first and a second time constant, using signals captured during sampling intervals one and two to derive said first time constant, and using signals captured during sampling intervals two and three to derive said second time constant;
   (e) means to derive the algebraic difference between said first and second time constants, and
   (f) means to regulate the amplitude of said reversed-polarity portion of said current wave form, based on the algebraic difference between said first and second time constants.

2. The metal detector of claim 1, wherein said transmitter coil energizing wave form changes polarity in a predetermined sequence.

3. The metal detector of claim 1, further comprising:
   (a) a look-up table containing gain-correction factors correlating the amplitude of said reversed-polarity portion of said coil energizing wave form with a reduction of sensitivity to targets with a given time constant;
   (b) means to modify the gain of the metal detector input amplifier according to said gain-correction factors, whereby the sensitivity to targets remains unchanged when the background signals change.

* * * * *